US008250475B2

(12) United States Patent
Malik et al.

(10) Patent No.: US 8,250,475 B2
(45) Date of Patent: Aug. 21, 2012

(54) MANAGING ICON INTEGRITY

(75) Inventors: Nadeem Malik, Austin, TX (US);
Katherine June Pearsall, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 11/956,799

(22) Filed: Dec. 14, 2007

(65) Prior Publication Data

US 2009/0158164 A1 Jun. 18, 2009

(51) Int. Cl.
| G06F 11/30 | (2006.01) |
| G06F 7/04 | (2006.01) |
| G06F 17/00 | (2006.01) |
| H04L 9/00 | (2006.01) |
| G06K 9/00 | (2006.01) |

(52) U.S. Cl. ........ 715/741; 713/170; 713/181; 713/165; 726/1; 726/4; 726/5

(58) Field of Classification Search .................. 715/741; 713/170, 181, 165; 726/1, 4, 5
See application file for complete search history.

(56) References Cited

U.S. PATENT DOCUMENTS

| 5,606,609 | A | * | 2/1997 | Houser et al. ................. 713/179 |
| 6,105,072 | A | | 8/2000 | Fischer |
| 7,047,406 | B2 | * | 5/2006 | Schleicher et al. ........... 713/168 |
| 7,328,456 | B1 | * | 2/2008 | Szor et al. ....................... 726/26 |
| 7,725,718 | B2 | * | 5/2010 | Langford ....................... 713/170 |
| 2002/0083341 | A1 | * | 6/2002 | Feuerstein et al. ............ 713/201 |
| 2003/0110384 | A1 | * | 6/2003 | Carro ............................. 713/181 |
| 2003/0188174 | A1 | * | 10/2003 | Zisowski ....................... 713/189 |
| 2004/0093506 | A1 | * | 5/2004 | Grawrock et al. ............. 713/189 |
| 2005/0097114 | A1 | * | 5/2005 | Carro ............................ 707/100 |
| 2007/0180528 | A1 | | 8/2007 | Kane |
| 2007/0260643 | A1 | * | 11/2007 | Borden et al. ................ 707/201 |
| 2007/0260880 | A1 | * | 11/2007 | Satterlee et al. .............. 713/164 |
| 2008/0256625 | A1 | * | 10/2008 | Baskaran et al. ................ 726/17 |
| 2010/0287196 | A1 | * | 11/2010 | Shields et al. ................ 707/769 |

FOREIGN PATENT DOCUMENTS

WO 0028420 5/2000

OTHER PUBLICATIONS

Microsoft Inc., Microsoft Authenticode Technology, Oct. 1996.*
Li-Guohui, et al., A Security Model for Online Accessing to Shared Devices, 2006, Networking, Sensing and Control, 2006. ICNSC '06. Proceedings of the 2006 IEEE International Conference on (1-4244-0065-1), p. 143-149.*

* cited by examiner

*Primary Examiner* — Jordany Nunez
(74) *Attorney, Agent, or Firm* — Yee & Associates, P.C.; Steven L. Bennett

(57) ABSTRACT

Icon integrity is managed. A notification for a selected icon is received and a determination is made whether a set of properties exists for the selected icon. Responsive to determining the existence and verification of the authenticity of the set of properties, the computer implemented method analyzes the set of properties to determine permission and authentication and responsive to determining the permission and authentication, allows execution of an executable function associated with the icon.

11 Claims, 4 Drawing Sheets

MANAGING ICON INTEGRITY

BACKGROUND OF THE INVENTION

1. Field of the Invention

The present invention relates generally to an improved data processing system and in particular to a computer implemented method, apparatus, and computer program product for managing icon integrity.

2. Description of the Related Art

Graphical user interface technology provides the primary interface between users of computing resources and the resources of the data processing systems. Many users do not know or care what system underlies the application they are using. The simple selection of an icon may result in one or more operations being performed.

For example, the task of printing has been reduced to selecting a printer icon and responding to criteria in a dialog or perhaps dragging the file onto a printer icon causing the file to print. In another example when desiring to connect to a remote site, a user may click the appropriate icon and be taken quickly to that site. There is no longer a need to type in a number of cryptic commands to accomplish a task.

Today on a platform using Microsoft Corporation Microsoft® Windows®, assigning an icon to a file may be accomplished with relative ease. Icons may be associated with executable and non-executable files. When an icon has been assigned to an executable file, typically selecting that icon will cause the file or program therein to execute. Application vendors rely on suitably designed icons to represent their products in a recognizable manner to the product user for easier startup and execution of their products.

The ready-to-run association capability may be exploited in a negative manner. For example, a virus may present a folder or some other icon, normally associated with a non-executable file to deceive a user. The user then selects the icon and unintentially executes the virus. Therefore, it would be advantageous to have a method, apparatus, and computer program product for processing icons in a manner that overcomes the problems discussed above.

BRIEF SUMMARY OF THE INVENTION

Illustrative embodiments provide a computer implemented method, an apparatus in the form of a data processing system, and a computer program product for managing icon integrity. In one illustrative embodiment, the computer implemented method receives a notification for a selected icon and determines whether a set of properties exists for the selected icon. Responsive to determining the existence of the set of properties, the computer implemented method analyzes the set of properties to determine a permission and authentication, and responsive to determining the permission and authentication, allows execution of an associated function.

In another embodiment, a data processing system comprises a bus, a memory connected to the bus, a display connected to the bus, a persistent storage connected to the bus, wherein the persistent storage comprising computer executable program code embodied therein, a communications unit, a processor connected to the bus. The processor executes the computer executable program code instructing the data processing system to receive a notification for a selected icon, determine whether a set of properties exists for the selected icon, and responsive to determining the existence of the set of properties, analyze the set of properties to determine a permission and authentication, and responsive to determining the permission and authentication, allow execution of an associated function.

In another illustrative embodiment, the computer program product comprises computer executable program code tangibly embodied on a computer usable recordable medium, the computer executable program code comprising, computer executable program code for receiving a notification for a selected icon, computer executable program code for determining whether a set of properties exists for the selected icon, computer executable program code responsive to determining the existence of the set of properties, for analyzing the set of properties to determine a permission and authentication, and computer executable program code responsive to determining the permission and authentication, for allowing execution of an associated function.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
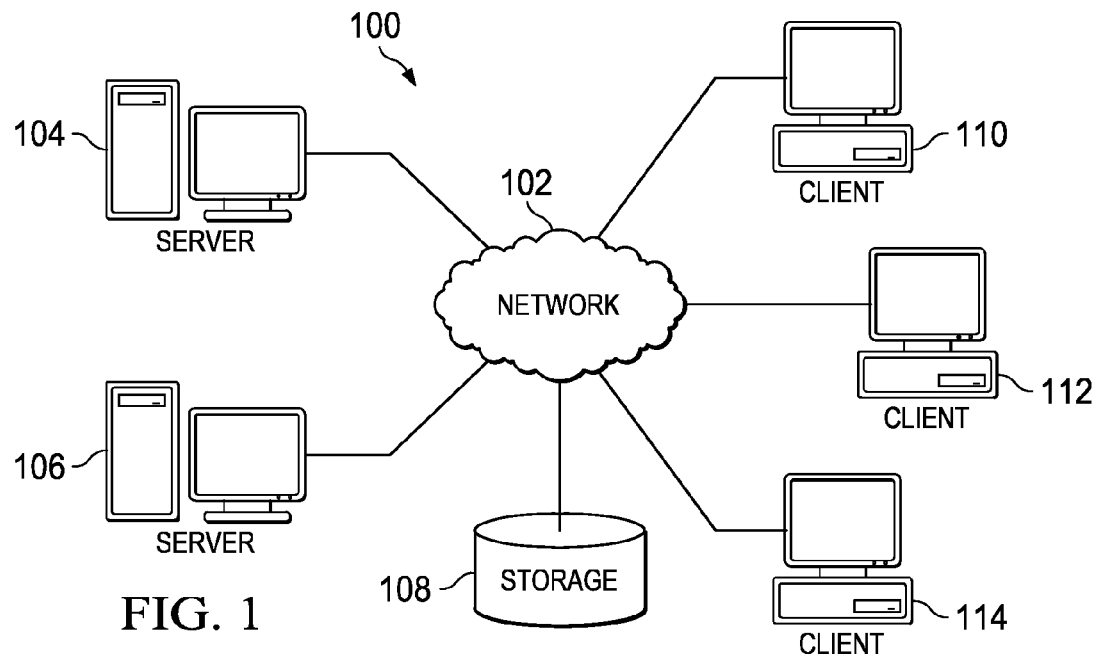
FIG. 1 is a pictorial representation of a network of data processing systems in which illustrative embodiments may be implemented.
Figure 2:
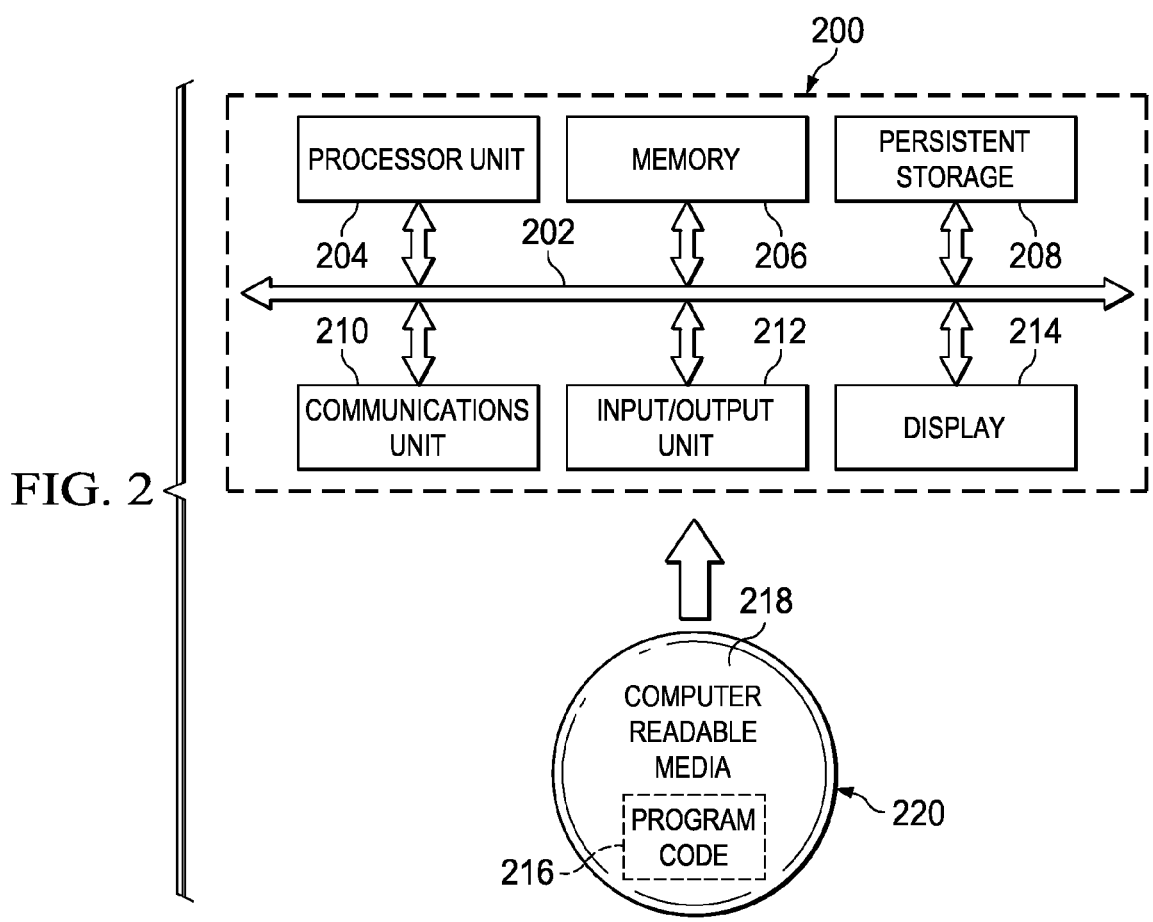
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

A mechanism to prevent a virus from being misrepresented as a "friendly" executable file is to use a digital signature and registration capability in the operating system for assigning a digital signature and a file association property to an icon at the operating system level. For example, in the network of systems of FIG. 1, a client 110 may desire to select a graphic icon to open a presumed file folder containing files stored on server 106. By examining the association property, the operating system of client 110 can determine if the icon is classified for use with a non-executable file, such as the file folder on server 106, and prevent association with an executable file, such as a virus. A file association and icon digital signature may be maintained in a repository in the form of a registry on a client, such as client 110 for use by the client or centrally on a server, such as server 106 accessible through a network such as network 102 by all connected systems of FIG. 1. Further, by examining the digital signature of the icon, the operating system is able to determine if the icon has been altered in an attempt to misuse the association property. The two step process of illustrative embodiments may typically prevent many of the system users from being deceived, for example, into clicking a file folder or a portable document folder file icon and causing a virus program to be executed.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

One example of an illustrative embodiment provides a computer implemented method for managing icon integrity. Integrity means the capability to use the icon for an original, intended purpose. In this instance, the computer implemented method comprises receiving a notification for a selected icon from user selection of the icon using a graphic user interface. The computer implemented method determines whether a set of properties exists for the selected icon. The set of properties includes a digital signature, and a file association registration.

Responsive to a determination that the set of properties exists, the computer implemented method analyzes the set of properties to determine permission and an authentication associated with the icon by determining whether the selected icon file association is valid for executables and determining whether the selected icon has been altered. Executables may be in the form of programs or files. Responsive to determining the permission and authentication associated with the icon integrity is in order, allowing execution of the function associated with the selected icon.

Figure 3:
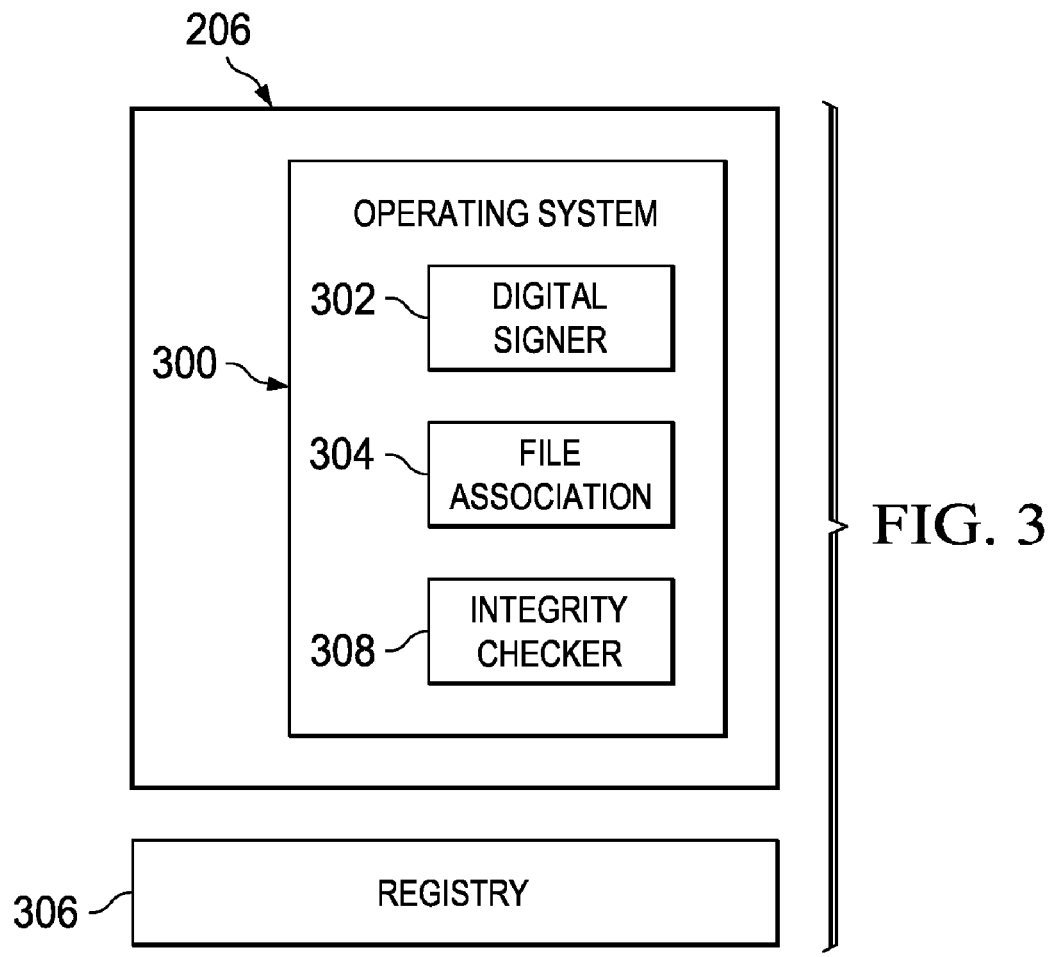
FIG. 3 is a block diagram of an operating system portion of the data processing system of FIG. 2, in accordance with illustrative embodiments.

With reference to FIG. 3, a block diagram of an operating system portion of the data processing system of FIG. 2, in accordance with illustrative embodiments is shown. Memory 206 of FIG. 2 contains operating system 300 for the purpose of controlling and managing the tasks of data processing system 200 of FIG. 2. Operating system 300 may be comprised of a number of complex components, known in the art, to perform the tasks required. Operating system 300, in accordance with illustrative embodiments, also comprises components including, but not limited to, digital signer 302, file association 304, and integrity checker 308. In addition, registry 306 shown connected to memory 206 and operating system 300, may also be implemented in an alternative manner directly within memory 206.

Digital signer 302 provides a capability to create digital signatures for various components, modules, elements or objects of the data processing system 200. A digital signature may be viewed as a "fingerprint" for a respective object and may be used to verify an object. For example, a digital signature may be tested to determine if an object has been altered because altering an object would create a different digital signature. A digital signature can be created for an object when the object is created, and updated when the object is modified by an authorized user.

A digitally signed file helps protect against changes to the file by validating a hashed entry of the file against a stored hash entry for the file in the form of a digital signature. Digitally signing the file helps to guarantee that users will know if a file has been modified. Operating systems, such as Microsoft® Windows® provide application programming interfaces (APIs), such as WinVerifyTrust, to help with creating and validating digital signatures. Application programming interfaces may also be provided as part of a cryptographic addition to a system, such as those offered by VeriSign® for developers. Digital signatures may be stored and maintained in a secure location, such as a registry on a system.

File association 304 provides a capability to associate an action or element with a file or object on the system. For example, in one form of association, actions may be associated with particular files, such as when "opening" file type "word processing document" use process or application "word processor." In another example, when selecting a "file folder" icon, invoke the "file system browser" to display the folder content.

Registry 306 provides a capability to centralize the storage of property information related to system objects, among other types of entries. For example, the file associations and digital signatures just described can be registered by type of file and related action. A request to registry 306 for uses of process "B" may enumerate a number of entries including the "opening" of file type "A." Registry 306 may also contain digital signatures of icons for future references during authentication checking.

Integrity checker 308 provides a capability to verify the usage of an object on the system that has been registered previously and has a digital signature. Integrity checker 308 will determine if the digital signature of an object is correct, as well as if the file association complies with the current usage request.

Figure 4:
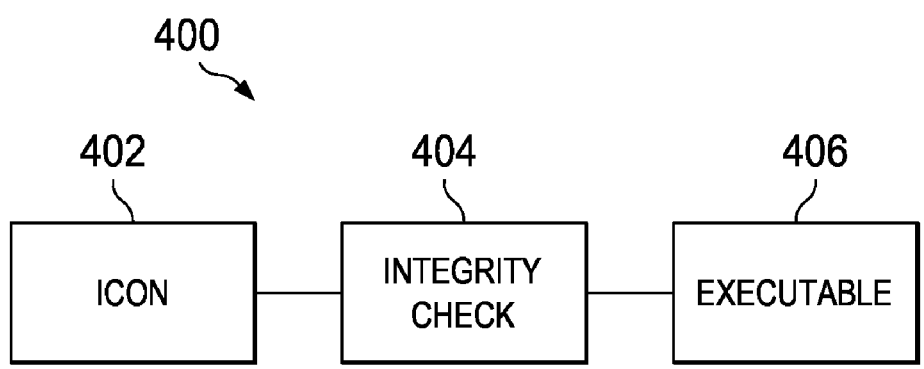
FIG. 4 is a block diagram of an association between an icon and an executable in the data processing system of FIG. 2, in accordance with illustrative embodiments.

With reference to FIG. 4, a block diagram of an association between an icon and an executable in the data processing system of FIG. 2, in accordance with illustrative embodiments is shown. The icon and executable association 400 now comprises an icon 402, an integrity check 404 and an executable 406. Icon 402 may or may not have the additional properties of a digital signature and a registered file association. Executable 406 remains unchanged.

Integrity check 404 is included to ensure the validity of a processing request based on the association of the graphic in the form of icon 402 to execute the executable 406. If icon 402 does not have the additional properties of a digital signature and a registered file association, then icon 402 will be processed in the current manner. If icon 402 has the additional properties of a digital signature and a registered file association, as described previously, icon 402 will be processed by the integrity checker 308 of FIG. 3 in accordance with illustrative embodiments.

Figure 5:
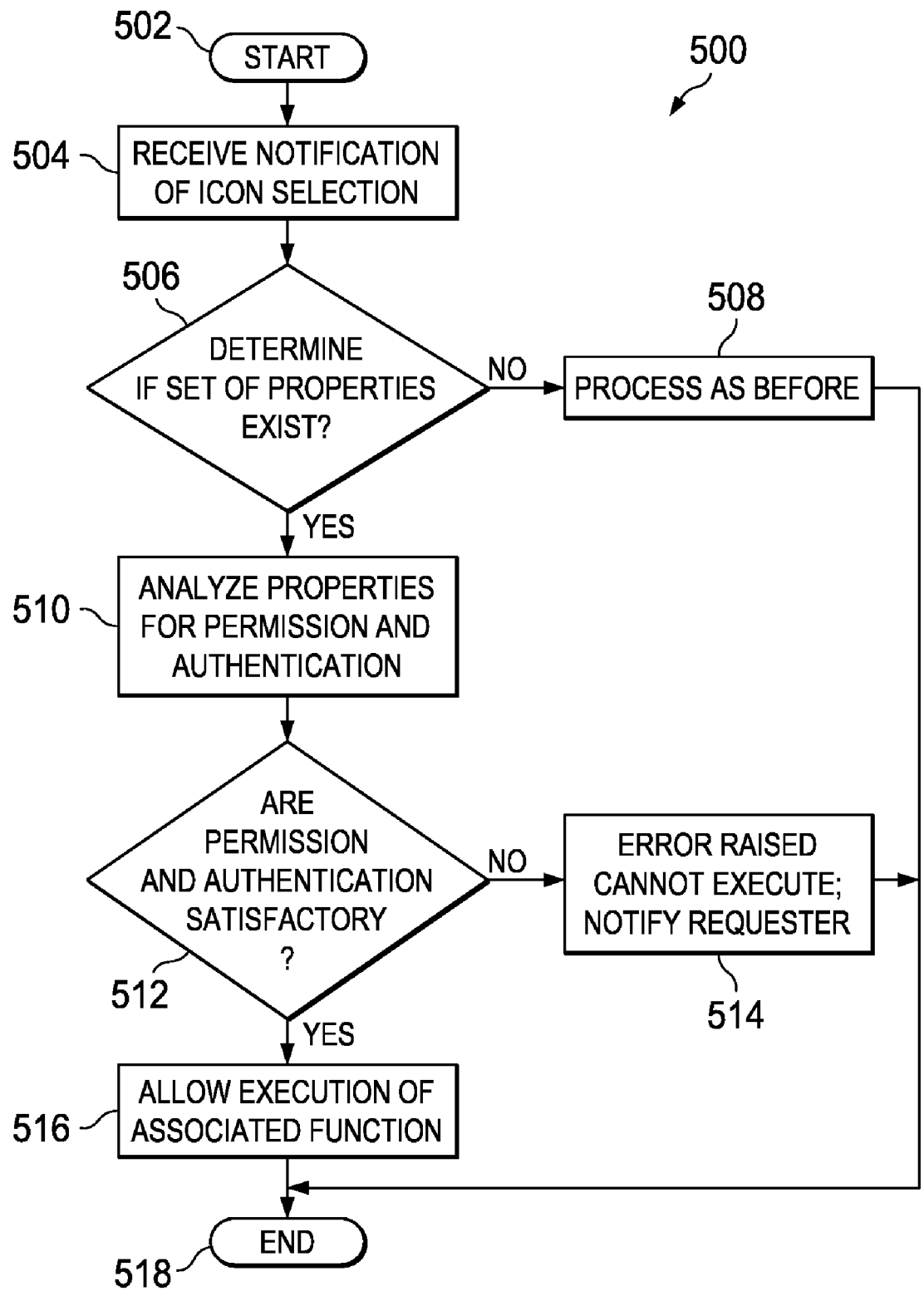
FIG. 5 is a flowchart of high level view of an integrity checking process of operating system 300 of FIG. 3, in accordance with illustrative embodiments.

With reference to FIG. 5, a flowchart of high level view of an icon integrity checking process of the operating system 300 of FIG. 3, in accordance with illustrative embodiments is shown. Process 500, is an example of an integrity checking process as may be performed by integrity checker 308 of FIG. 3, in accordance with illustrative embodiments.

Process 500 starts (step 502) and receives a notification for a selected icon (step 504). A determination is made whether a set of properties exists for the selected icon (step 506). The set of properties including a digital signature and a file association registration. If there are no properties or the properties do not contain a digital signature and a file association registration, then a "no" results in step 506. If properties exist and contain a digital signature and a file association registration, then a "yes" results in step 506.

If a "no" was obtained in step 506, processing of the icon would occur as before without any additional information regarding the usage of the icon. If a "yes" was obtained in step 506, the set of properties is analyzed for permission and authentication (step 510). The permission is the defined use of the icon. For example when the icon is associated with an executable file the icon is permitted to run the executable file. The permitted use and the requested use for the icon must match. Authentication involves determining whether the icon and its properties have been altered. Alteration involves modification of the properties without authorization. For example, an icon has attributes set to NOT permit association with an executable program and is registered. A change in the association afterwards occurs but is not registered. A check will then determine digital signatures of the registered version and unregistered version do not match and the icon will not be authenticated.

A determination is made whether permission and authentication are satisfactory for the selected icon (step 512). If the permission and authentication are not satisfactory, a "no" results and an error is raised, the associated function cannot be executed and a requester is notified (step 514). If the permission and authentication are satisfactory, a "yes" results to allow execution of the associated function (step 516) with process 500 terminating thereafter (step 518).

responsive to determining the permission and authentication associated with the icon integrity, allowing execution of an associated function.

Figure 6:
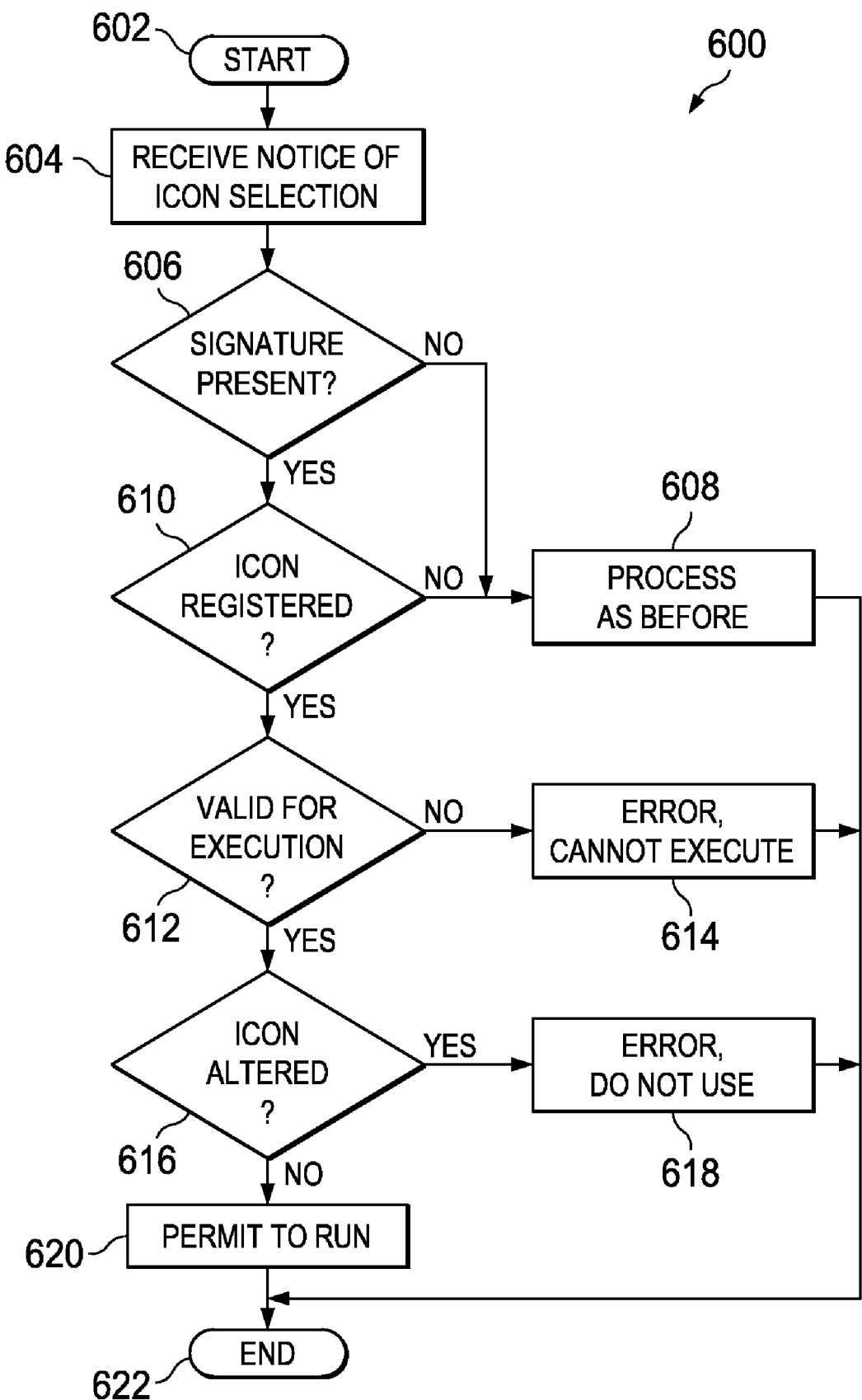
FIG. 6 is a flowchart of a detail level view of integrity checking process of FIG. 5, in accordance with illustrative embodiments.

With reference to FIG. 6, a flowchart of an icon integrity checking process of operating system 300 of FIG. 3, in accordance with illustrative embodiments is shown. Process 600, is an example of an integrity checking process as may be performed by integrity checker 308 of FIG. 3, in accordance with illustrative embodiments.

Process 600 starts (step 602) and receives notification of an icon selection (step 604). The notification is the selection of an icon by a user or requester. The user selects a specific icon using the graphical user interface expecting the performance of a related function. A determination is made whether the icon selected has a digital signature (step 506). If no signature is present, a "no" result is obtained in step 606 and process 600 would continue to process the icon in a conventional manner without authentication, terminating thereafter (step 622). If the digital signature was present, a "yes" result is obtained in step 606 and a determination is made whether the icon is registered (step 510).

If the determination in step 610 results in a "no", no registration of the selected icon is present and process 600 would continue to process the icon in a conventional manner, again absent any authentication. If a "yes" was obtained in step 610, a determination of whether the icon had a property entitling execution is made (step 612). If the icon is valid for execution a "yes" would result; otherwise a "no" results.

Having obtained a "no" in step 612, the execution cannot be performed and an error is raised to the requester (step 614) with process 600 terminating thereafter (step 622). The error raised may be in the form of a message to the requester indicating the nature of the issue. Depending upon the installation choice a dialog may be shown to the requester suggesting the icon could not be verified and may prompt the requester to determine to proceed or cancel. If a "yes" was obtained in step 612, a determination of whether the icon had been altered is made (step 616). In this instance, concern is with an icon that retains the same visual appearance but is linked to a different function. The icon has had the intended purpose changed or altered. An icon can be altered by having the object association changed. For example the folder icon is meant to open a folder for viewing of contents. When altered the same graphic icon of a folder may be now linked to an executable of a virus program.

The determination typically involves authentication of the icon by a comparison of the digital signature of the selected icon with a corresponding digital signature stored in a registry. If the analysis results in an assessment that alteration has occurred, a "yes" result would be obtained, otherwise no alteration would produce a "no" result.

Having obtained a "yes" in step 616, indicating an altered state and authenticity cannot be assured, an error would be raised to the requester and the associated operation not performed (step 618). If the result of step 616 was "yes", authenticity is assured and the requested operation is permitted to execute (step 620) with process 600 terminating thereafter (step 622).

Thus, the illustrative embodiments provide a method for managing icon integrity. In these examples, a two prong validation of an icon is present to aid requesters in determining the safety of executing a request based on the selection of a graphic representation. The validity checking determines if the action associated with the graphic is valid and if the graphic representation has been altered. The validity check performs a validation and integrity check on the icon to assure authenticity of both the object and the permitted purpose prior to further processing of the request.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing icon integrity, the computer implemented method comprising:
receiving a notification for a selected graphic icon; determining whether a set of properties exists for the selected graphic icon; and
examining the selected graphic icon for the set of properties comprising a digital signature, and a file association registration;
responsive to determining the existence of the set of properties, analyzing the set of properties to determine a permission based on whether the selected graphic icon file association registration is valid for executables, and an authentication based on whether the selected graphic icon has been altered; and
responsive to determining the permission and the authentication associated with the selected graphic icon, allowing execution of an associated function;
wherein analyzing the set of properties to determine the permission and the authentication further comprises:
comparing the digital signature and the file association registration for the selected graphic icon with a corresponding digital signature and a corresponding file association registration in a registry.

2. The computer implemented method of claim 1, wherein responsive to determining the permission further comprises:
notifying a requester; and
prompting the requester to choose to execute.

3. The computer implemented method of claim 1, wherein responsive to determining the selected graphic icon has been altered further comprises:
notifying a requester and preventing the execution.

4. The computer implemented method of claim 1, wherein responsive to determining the authentication further comprises:
notifying a requester and prompting the requester to choose to execute.

5. A data processing system for managing icon integrity, the data processing system comprising:
a bus;
a memory connected to the bus;
a display connected to the bus;
a persistent storage connected to the bus, wherein the persistent storage comprising
computer executable program code embodied therein; a communications unit;
a processor connected to the bus, wherein the processor executes the computer executable program code instructing the data processing system to:
receive a notification for a selected graphic icon;
determine whether a set of properties exists for the selected graphic icon; and
examine the selected graphic icon for the set of properties comprising a digital signature, and a file association registration;
responsive to determining the existence of the set of properties, analyze the set of properties to determine a permission based on whether the selected graphic icon file association registration is valid for executables, and an authentication based on whether the selected graphic icon has been altered; and
responsive to determining the permission and the authentication associated with the selected graphic icon, allowing execution of an associated function;
wherein the processor executes the computer executable program code instructing the data processing system to analyze the set of properties to determine the permission and the authentication further comprises:
comparing the digital signature and the file association registration for the selected graphic icon with a corresponding digital signature and a corresponding file association registration in a registry.

6. The data processing system of claim 5, wherein the processor executes the computer executable program code instructing the data processing system to respond to determining the permission further comprises:
notifying a requester; and
prompting the requester to choose to execute.

7. The data processing system of claim 5, wherein the processor executes the computer executable program code instructing the data processing system to respond to determining the selected graphic icon has been altered further comprises:
notifying a requester and preventing the execution.

8. The data processing system of claim 5, wherein the processor executes the computer executable program code instructing the data processing system to respond to determining the authentication further comprises:
notifying a requester and prompting the requester to choose to execute.

9. A computer program product comprising a computer-readable, tangible storage device and computer-readable program instructions stored on the computer-readable, tangible storage device for managing icon integrity, the computer-readable program instructions, when executed by a CPU perform steps including:
receiving a notification for a selected graphic icon; determining whether a set of properties exists for the selected graphic icon; and
examining the selected graphic icon for the set of properties comprising a digital signature, and a file association registration;
responsive to determining the existence of the set of properties, analyzing the set of properties to determine a permission based on whether the selected graphic icon file association registration is valid for executables, and an authentication based on whether the selected graphic icon has been altered; and
responsive to determining the permission and the authentication associated with the selected graphic icon allowing execution of an associated function;
wherein analyzing the set of properties to determine the permission and the authentication further comprises:
comparing the digital signature and the file association registration for the selected graphic icon with a corresponding digital signature and a corresponding file association registration in a registry.

10. The computer program product of claim 9, wherein responsive to determining the permission further comprises:
notifying a requester and prompting the requester to choose to execute.

11. The computer program product of claim 9, wherein responsive to determining the selected graphic icon has been altered further comprises:
notifying a requester and preventing the execution.

* * * * *